(12) United States Patent
Allen et al.

(10) Patent No.: US 6,517,225 B1
(45) Date of Patent: Feb. 11, 2003

(54) LIGHT TILTING APPARATUS

(75) Inventors: Bradley K. Allen, Redmond, WA (US); Mark Mattson, Renton, WA (US)

(73) Assignee: Genie Industries, Inc., Redmond, WA (US)

( * ) Notice: Subject to any disclaimer, the term of this patent is extended or adjusted under 35 U.S.C. 154(b) by 0 days.

(21) Appl. No.: 09/780,891

(22) Filed: Feb. 9, 2001

Related U.S. Application Data
(60) Provisional application No. 60/262,559, filed on Jan. 18, 2001.

(51) Int. Cl.[7] .................................................. B60Q 3/00
(52) U.S. Cl. ........................ 362/485; 362/250; 362/238; 362/403; 362/233
(58) Field of Search ................................ 362/250, 238, 362/171, 431, 403, 414, 485, 233, 249

(56) References Cited

U.S. PATENT DOCUMENTS

| | | |
|---|---|---|
| 504,987 A | 9/1893 | Marum |
| 3,381,118 A | 4/1968 | Widner |
| 3,569,690 A * | 3/1971 | Nelson |
| 4,118,907 A | 10/1978 | Small et al. |
| 4,220,981 A * | 9/1980 | Koether |
| 4,237,530 A | 12/1980 | Murray et al. |
| 4,413,451 A | 11/1983 | Featherstone et al. |
| 4,423,471 A | 12/1983 | Gordin et al. |
| 4,488,209 A | 12/1984 | Gosswiller |
| 4,600,980 A | 7/1986 | Dahlgren |
| 4,712,167 A | 12/1987 | Gordin et al. |
| 4,819,143 A | 4/1989 | Teichmann |
| 4,932,176 A | 6/1990 | Roberts et al. |
| 5,115,606 A | 5/1992 | Renegar et al. |
| 5,129,199 A | 7/1992 | Miller et al. |
| 5,168,680 A | 12/1992 | Matlock |
| 5,207,747 A | 5/1993 | Gordin et al. |
| 5,272,609 A | 12/1993 | Nelson |
| 5,524,398 A | 6/1996 | Miller et al. |
| 5,572,837 A | 11/1996 | Featherstone et al. |
| 5,611,177 A | 3/1997 | Herbstritt |
| 5,718,087 A | 2/1998 | Featherstone et al. |
| 5,743,635 A | 4/1998 | Hulse et al. |
| 5,806,963 A | 9/1998 | Miller et al. |
| D399,595 S | 10/1998 | Miller et al. |
| 5,980,070 A | 11/1999 | Hulse et al. |

FOREIGN PATENT DOCUMENTS

| | | |
|---|---|---|
| DE | 36 15 206 | 11/1987 |
| FR | 2 236 144 | 1/1975 |

OTHER PUBLICATIONS

Photographs of light towers made by Allmand Brothers, Inc. of Holdredge, Nebraska and Magnum Products of Berlin, Wisconsin.

* cited by examiner

*Primary Examiner*—Sandra O'Shea
*Assistant Examiner*—Guiyoung Lee
(74) *Attorney, Agent, or Firm*—Perkins Coie LLP

(57) ABSTRACT

A light tilting apparatus usable with an extendable light. In one embodiment, a mobile lighting system includes a tiltable light assembly mounted to an extendable tower on a trailer. The tiltable light assembly includes one or more lights fixedly mounted to a tilting member pivotably mounted to the extendable tower. A linkage operably connected to the tilting member at one end has a catch on a distal end. A linkage regulator attached to the extendable tower has a guide portion for the linkage to pass through as the extendable tower is extended and retracted. The linkage regulator is configured to engage the catch on the distal end of the linkage when the extendable tower reaches a preselected extension position restricting further motion of the linkage in the direction of tower extension. The linkage causes the tilting member to pivot and rotate the lights downward with continued extension of the extendable tower past the preselected extension position. Retraction of the extendable tower back to the preselected extension position, accordingly, results in causing rotation of the lights upwardly.

44 Claims, 6 Drawing Sheets

LIGHT TILTING APPARATUS

RELATED APPLICATIONS

This application claims the benefit of the U.S. Provisional Patent Application having Ser. No. 60/262,559, titled "Light Tilting Apparatus," filed Jan. 18, 2001, currently pending and incorporated herein by reference.

TECHNICAL FIELD

The present invention is directed to apparatuses for tilting light assemblies, and more particularly, to apparatuses for tilting light assemblies mounted to extendable towers on lighting systems.

BACKGROUND OF THE INVENTION

Mobile lighting systems are used extensively to provide necessary light for outdoor and other work sites lacking adequate ambient lighting. Conventional mobile lighting systems often comprise an extendable light tower and an electrical power generator mounted to a trailer. The extendable light tower can be raised to provide the desired illumination once the trailer has been properly situated at a work site. Typically, the extendable light tower will be rotatably mounted to the trailer so that the lights can be aimed in different directions by rotating the tower relative to the trailer. This rotation can provide a means for changing the horizontal direction of the lights. To provide proper illumination at a work site, however, it is often also necessary to change the vertical direction of the lights by adjusting the tilt angle of the lights relative to the extendable light tower.

Adjusting the tilt angle of the lights relative to the extendable light tower using conventional systems often requires lowering the tower back down toward the ground so that the light assembly can be adjusted by hand. The extendable light tower must then be raised back up again to check the tilt angle. Frequently, this process is repeated several times before the desired tilt angle is achieved.

Various devices for tilting the lights on mobile lighting systems have been produced and they fit into two basic categories. The first category of tilting device utilizes powered servos or motors that are remotely controlled on the ground. These systems can be expensive and unreliable, and as such they do not fit well into an overall mobile lighting system scheme of being simple and inexpensive.

The second category of tilting device utilizes a system of cables and mechanical controls running from the lights to the ground. These mechanical controls are manually operated on the ground to tilt the lights on the extended tower. The complexity of this type of tilting device is difficult to incorporate into the telescoping light towers so often used with mobile lighting systems today. As a result, no commercially viable form of this tilting device is currently known. Based on the foregoing, a mobile lighting system having an inexpensive light tilting apparatus reliably incorporated with an extendable light tower would be desirable.

SUMMARY OF THE INVENTION

A light tilting apparatus that can be incorporated with an extendable tower is provided. In one embodiment, a mobile lighting system includes a tiltable light assembly mounted to an extendable tower. The tiltable light assembly includes one or more lights and the light tilting apparatus of the present invention. In one aspect of this embodiment, the light tilting apparatus includes a tilting member pivotally mounted to the extendable tower so that pivoting motion of the tilting member results in tilting of the lights relative to the extendable tower. A linkage positioned substantially parallel to, and offset from, the extendable tower is operably connected to the tilting member at one end and has a catch on a distal end away from the tilting member. A linkage regulator attached to the extendable tower has a guide portion for the linkage to pass through as the extendable tower is extended and retracted. The linkage regulator is configured to engage the catch on the linkage when the extendable tower reaches a preselected extension preventing further motion of the linkage in the direction of tower extension.

As long as the linkage is free to pass upward through the linkage regulator, springs keep the tilting member angled at a maximum upward angle and in contact with a limit restrictor. When the linkage regulator engages the catch on the linkage, the halted linkage causes the tilting member to begin rotating downward, resulting in a tilting of the lights downward. Continued extension of the extendable tower results in more downward tilting of the lights, ultimately coming to rest at a maximum downward tilt angle when the extendable tower is fully extended. Retraction of the extendable tower from this fully extended position will accordingly allow the lights to tilt upward. To tilt the lights to a desired angle, the extendable tower is extended until the catch on the linkage just engages the linkage regulator. By controlling further extension of the extendable tower after engagement, any tilt angle of the lights between the maximum upward tilt angle and the maximum downward tilt angle can be achieved.

DETAILED DESCRIPTION

In the following description, certain specific details are set forth in order to provide a thorough understanding of various embodiments of the invention. The present disclosure describes light tilting apparatuses mountable to extendable towers on mobile lighting systems in accordance with one embodiment of the present invention. Many specific details of certain embodiments of the invention are set forth in the following description and in FIGS. 1 through 7 to provide a thorough understanding of these embodiments. One skilled in the relevant art will understand, however, that the present invention may have additional embodiments, or that the invention may be practiced without several of the details described below. In other instances, well known structures associated with mobile lighting systems, such as telescoping towers and trailer-mounted electrical power generators, have not been shown or described in detail to avoid unnecessarily obscuring the description of the embodiments of the invention.

Figure 1:
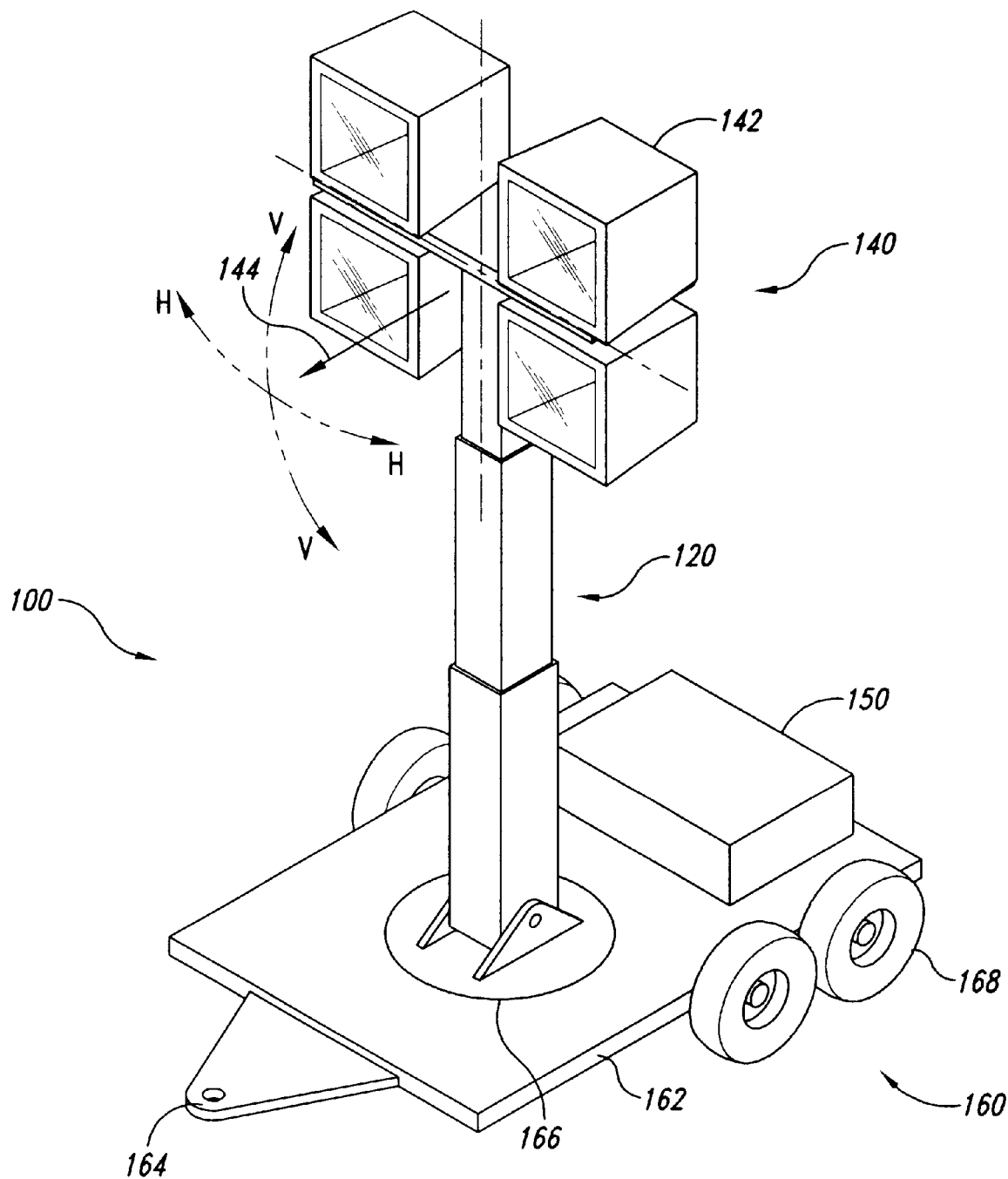
FIG. 1 is an isometric view of a mobile lighting system having an extendable light tower with a tiltable light assembly in accordance with an embodiment of the invention.

FIG. 1 is an isometric view of a mobile lighting system 100 having an extendible light tower 120 with a tiltable light assembly 140 in accordance with an embodiment of the invention. In one aspect of his embodiment, the mobile lighting system 100 also includes a trailer 160 and an electrical power generator 150. The trailer 160 has a trailer bed 162 with a tow coupling 164 for attachment to a suitable tow vehicle. A wheel set 168 supports the trailer bed 162 and provides mobility to the mobile lighting system 100. The electrical power generator 150 is mounted to the trailer 160 and can provide electric power for lights 142 on the tiltable light assembly 140.

A rotatable coupling 166 mounts the extendible light tower 120 to the trailer bed 162, and is configured to allow vertical rotation of the extendible light tower from an approximately horizontal stowed position to a more vertical operating position, such as that shown in FIG. 1. The rotatable coupling 166 is also configured to allow rotation of the extendible light tower 120 horizontally about an axis perpendicular to the trailer bed 162. Using this horizontal rotation, a projection axis 144 of the lights 142 can be moved along a horizontal arc H—H without moving the trailer 160.

The mobile lighting system 100 is towed to a work site with the extendible light tower 120 in a retracted and horizontally stowed position. Once properly situated at the site, the extendible light tower 120 can be rotated to a more vertical operating position and extended to a selected height to provide light to the work area of interest. As will be described in greater detail below, the direction of the projection axis 144 along a vertical arc V—V can then be easily controlled by adjusting the extension of the extendable light tower 120.

Figure 2:
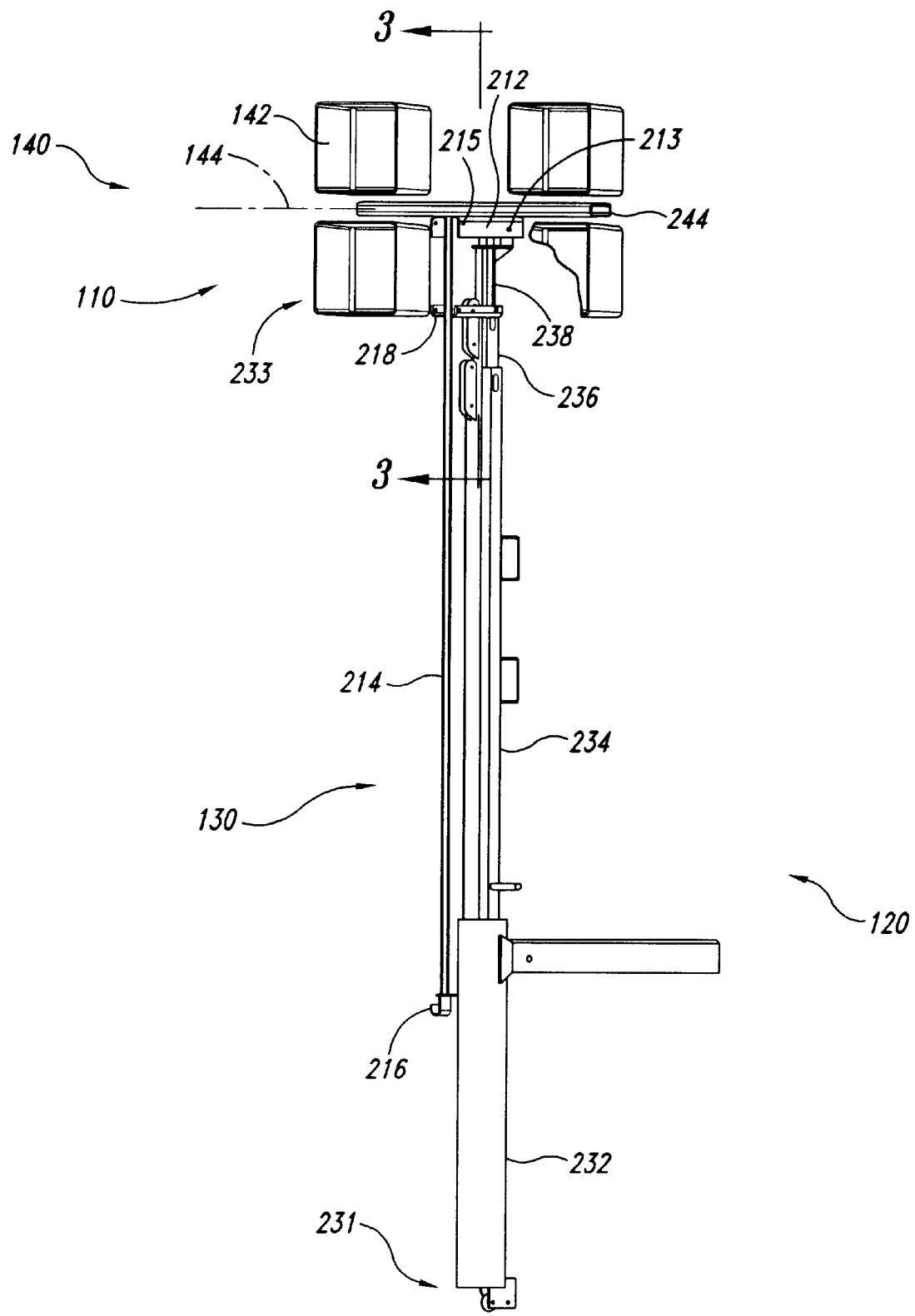
FIG. 2 is an enlarged isometric view of the extendible light tower and tiltable light assembly of FIG. 1 in accordance with an embodiment of the invention.

FIG. 2 is an enlarged isometric view of the extendible light tower 120 of FIG. 1 in accordance with an embodiment of the invention. In one aspect of this embodiment, the extendible light tower 120 includes a telescoping tower assembly 130 and the tiltable light assembly 140. The telescoping tower assembly 130 has a base segment 232 toward a lower end 231 that is mountable to the rotatable coupling 166 on the trailer bed 162 (FIG. 1). A first telescoping segment 234 is coaxially and slidably disposed within the base segment 232. A second telescoping segment 236 is coaxially and slidably disposed within the first telescoping segment 234, and an innermost third telescoping segment 238 toward an upper end 233 is similarly coaxially and slidably disposed within the second telescoping segment 236. Although in this embodiment the telescoping tower assembly 130 has three telescoping segments, in other embodiments a telescoping tower assembly can have more or less telescoping segments without exceeding the scope of the present invention.

In one aspect of this embodiment, the telescoping segments 234, 236, and 238 can be extended and retracted using a conventional hydraulic system (not shown). In other embodiments, other systems, such as a cable actuated pulley system or an electric motor system, can be used to extend and retract the telescoping tower assembly 130. And in yet other embodiments, other types of extendable towers can be used in place of the telescoping tower assembly 130. For example, an extendable scissors type tower can be used.

The tiltable light assembly 140 can be raised with the telescoping tower assembly 130 by extending the first telescoping segment 234, the second telescoping segment 236, and then the third telescoping segment 238. The tiltable light assembly 140 is fully raised when each of the telescoping segments 234, 236, and 238 have been fully extended. In FIG. 2 for example, the tiltable light assembly 140 is shown in a partially raised configuration, as only the first telescoping segment 234 is fully extended.

The tiltable light assembly 140 of this embodiment includes the four lights 142 fixedly attached to a light bar 244. In other embodiments, more or less lights can be used depending on the extent of illumination desired or the type of lights being used, and the light bar 244 can be a frame assembly. The light bar 244 is fixedly attached to a light tilting apparatus 110. The light tilting apparatus 110 includes a tilting member 212, a linkage 214, and a linkage regulator 218. The tilting member 212 is pivotally connected to the third telescoping segment 238 at a first pivot point 213. As the tilting member 212 pivots upwardly or downwardly about the first pivot point 213, the projection axis 144 tilts accordingly along the vertical arc V—V shown in FIG. 1.

The linkage 214 of the illustrated embodiment is an elongated rigid shaft having one end operably connected to the tilting member 212 at a second pivot point 215. The second pivot point 215 is offset from the first pivot point 213 so that motion of the third telescoping segment 238 relative to the linkage 214 causes a tilting of the tilting member 212, as discussed in greater detail below. The linkage 214 is positioned substantially parallel to the telescoping tower assembly 130, and passes through the linkage regulator 218, which regulates the position and motion of the linkage 214. The linkage regulator 218 of the illustrated embodiment is a rigid guide member fixedly attached at a substantially right angle to the second telescoping segment 236.

A catch 216 is rigidly attached to a distal end of the linkage 214, and is configured to engage the linkage regulator 218 before the third telescoping segment 238 has reached its full extension. The catch 216 of the illustrated embodiment is a "J"-shaped hook. Alternate embodiments can use other kinds of catches 216 adapted to engage the linkage regulator 218 before the third telescoping segment 238 reaches the fully extended position. As the third telescoping segment 238 continues extending beyond the point where the catch 216 initially engages the linkage regulator 218, the catch hooks onto the linkage regulator thereby stopping the linkage's upward movement relative to the linkage regulator and the second telescoping segment 236. The third telescoping segment 238, however, can continue its upward movement after the catch 216 hooks onto the linkage regulator 218. As a result, the linkage 214 pulls on the tilting member 212 and causes the tilting member to pivot downwardly about the first pivot point 213. This downward pivoting motion of the tilting member 212 will accordingly cause the projection axis 144 to tilt downwardly along the vertical arc V—V (FIG. 1). Thus, the tilt angle of the light bar 244 and the lights 142 can be adjusted by controlling the extension of the third telescoping segment 238.

Figure 3:
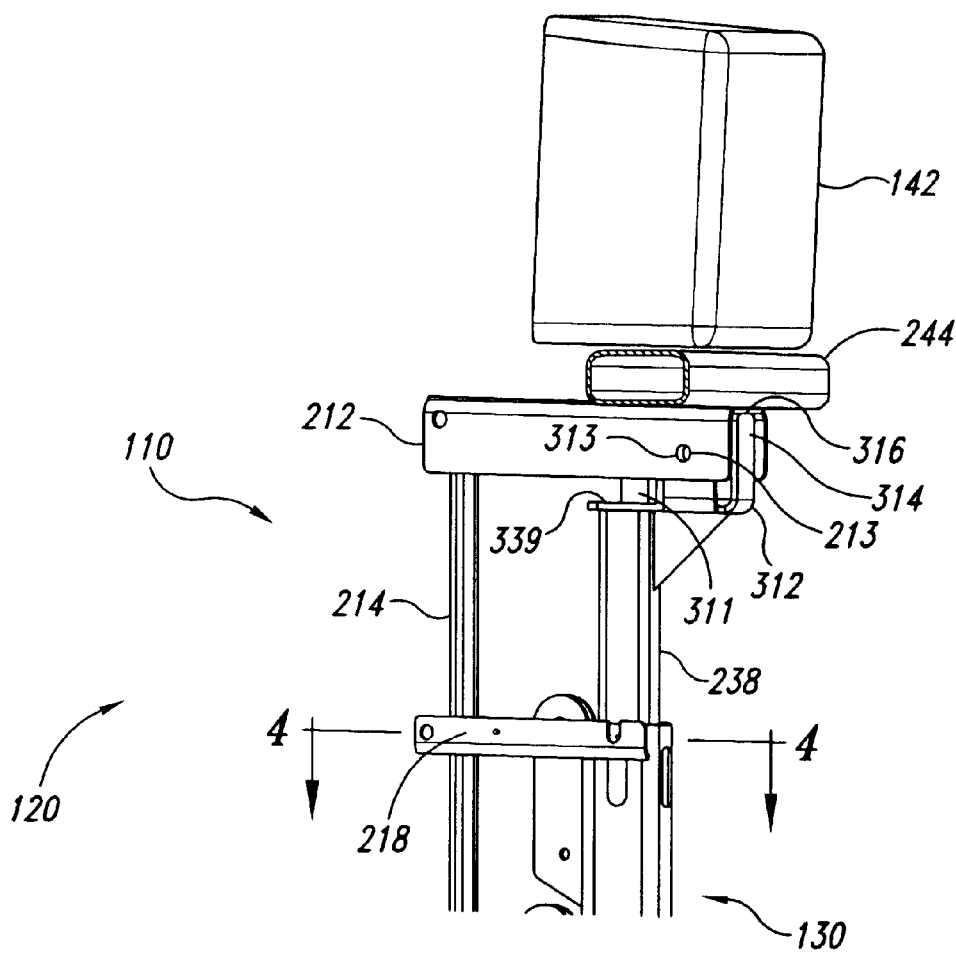
FIG. 3 is an enlarged partial cross-sectional view taken substantially along lines 3—3 in FIG. 2.

FIG. 3 is an enlarged partial cross-sectional view of the extendible light tower 120 taken substantially along lines 3—3 in FIG. 2 in accordance with an embodiment of the invention. The third telescoping segment 238 of the telescoping tower assembly 130 is shown in a retracted or partially extended position, as evidenced by the catch 216 (FIG. 2) not being engaged with the linkage regulator 218. A pin 313 rotatably connects the tilting member 212 to a mounting bracket 312 at the first pivot point 213. The mounting bracket 312 is fixedly attached to the top end of the third telescoping segment 238, and includes a limit restrictor 314 having a bearing surface 316.

A biasing member 311 is positioned between the tilting member 212 and the third telescoping segment 238 offset from the first pivot point 213, and exerts a biasing force upwardly on the tilting member from a top surface 339 of the third telescoping segment. In one embodiment the biasing member 311 can be a compression spring. In other embodiments, the biasing member 311 can be other biasing media such as a compressible rubber element. The force of the biasing member 311 pushing upwardly on the tilting member 212 biases the tilting member 212 upward about the first pivot point 213. The bearing surface 316 of the limit restrictor 314, however, comes into contact with the tilting member 212 once the tilting member achieves a preselected angle, thus limiting the upward pivoting motion of the tilting member to the preselected angle. When the third telescoping segment 238 is in a retracted or partially extended position such that the catch 216 has not engaged the linkage regulator 218 (such as shown in FIG. 2), the tilting member 212 rests against the bearing surface 316 under the force of the biasing member 311. Subsequent downward pivoting motion of the tilting member 212 away from the limit restricter 314 is resisted, but not prevented, by the biasing member 311. In the illustrated embodiment, this downward pivoting motion is ultimately limited by the top surface 339 of the third telescoping segment 238, although alternate embodiments can use other mechanisms to stop or limit the tilting member's pivoting motion.

Figure 4:
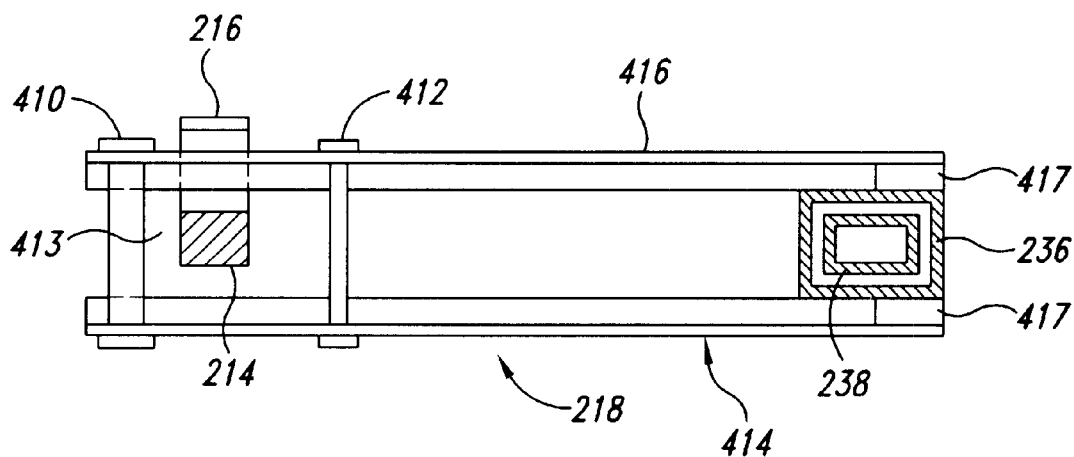
FIG. 4 is an enlarged cross-sectional view taken substantially along lines 4—4 in FIG. 3.

FIG. 4 is an enlarged cross-sectional view of the linkage regulator 218 taken substantially along lines 4—4 in FIG. 3 in accordance with an embodiment of the invention. The linkage regulator 218 includes a first support arm 414, a second support arm 416, a first guide pin 410, and a second guide pin 412. Brackets 417 fixedly attach the first and second support arms 414 and 416 to the second telescoping segment 236. The second guide pin 412 is offset from the first guide pin 410, the space therebetween defining a guide portion 413. The linkage 214 extends through the guide portion 413 so the linkage is slidably retained between the guide pins 410 and 412 and the first and second support arms 414 and 416 as the linkage moves upwardly and downwardly relative to the linkage regulator 218. Importantly, the catch 216 attached to the linkage's distal end is shaped and sized to positively engage the linkage regulator's second support arm 416 and to prevent further upwardly movement of the linkage as the third telescoping segment 238 continues its upward movement and approaches full extension. The catch 216 in the illustrated embodiment is generally hook-shaped to facilitate engagement with the second support arm 416. In other embodiments, other shapes, for example inverted "T" shapes, can be used for the catch 216.

Figure 5A:
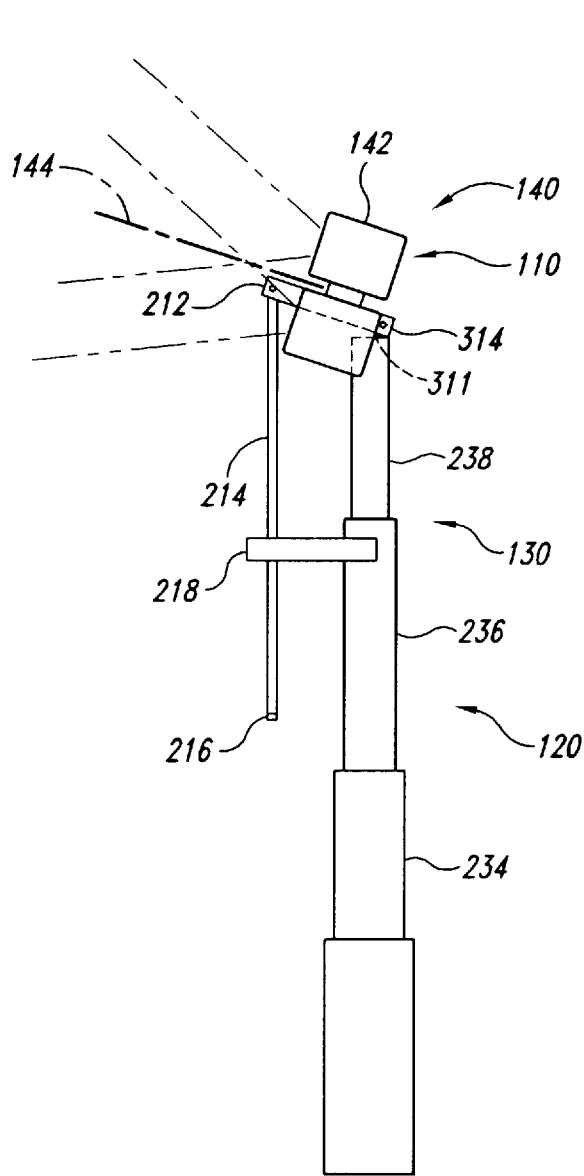
FIG. 5A is an enlarged side elevational view of the extendible light tower of FIG. 1 illustrating the tiltable light assembly positioned with an upwardly directed projection axis.
Figure 5B:
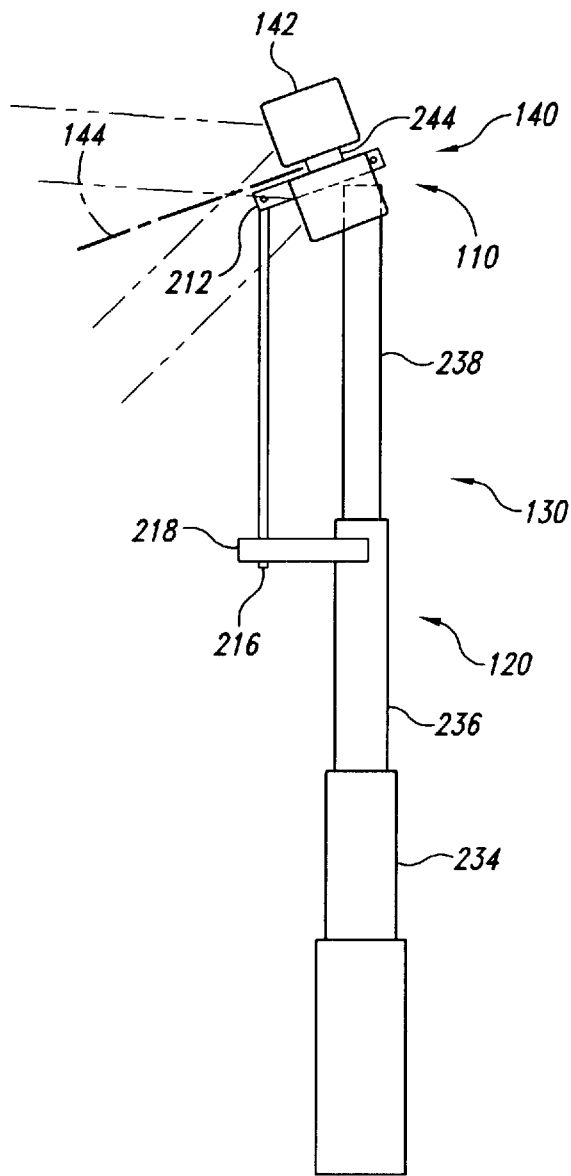
FIG. 5B is an enlarged side elevational view of the extendible light tower of FIG. 1 illustrating the tiltable light assembly positioned with a downwardly directed projection axis.

FIGS. 5A and 5B are side elevation views of the extendible light tower 120 illustrating the tilting function of the light tilting apparatus 110 in accordance with an embodiment of the invention. In FIG. 5A, the first and second telescoping segments 234 and 236 have been fully extended, and the third telescoping segment 238 is only partially extended from the second telescoping segment. Accordingly, the distal end of the linkage 214 and the catch 216 are below the linkage regulator 218, so the third telescoping segment 238 can freely move upwardly toward its full extension position. As long as the linkage 214 is free to pass upward through the linkage regulator 218, the biasing member 311 will keep the tilting member 212 in contact with the limit restrictor 314, and the projection axis 144 of the lights 142 will remain pointed upwardly at a maximum upward tilt angle.

In FIG. 5B, the third telescoping segment 238 is shown approaching its full extension position. As a result, the catch 216 on the linkage 214 engages the linkage regulator 218 and the linkage is blocked from further upward movement. Continued extension of the third telescoping segment 238 pushes the tilting member 212, the tilt bar 244, and the lights 142 upwardly. The linkage 214, however, cannot continue the upward movement, so the linkage pulls downwardly on the free end of the tilting member 212, thereby causing the tilting member to pivot about the first pivot point 213 downwardly. As the tilting member 212 pivots about the first pivot point 213, the tilting member compresses the biasing member 311 against the top surface 339 of the third telescoping segment 238.

The downward rotation of the tilting member 212 causes downward rotation of the light bar 244 and the lights 142 as a unit, thereby rotating the projection axis 144 downwardly. The projection axis 144 is positioned at a maximum downward tilt angle when the third telescoping segment 238 is fully extended. As mentioned above, the biasing member 311 bias the tilting member 212 upwardly. Retraction of the third telescoping segment 238 from this fully extended position allows the biasing member 311 to pivot the tilting member 212 upwardly about the first pivot point 213, thereby causing the projection axis 144 to rotate in an upward direction. The tilting member 212, and thus the lights 142 and the projection axis 144, continue rotating upwardly as the third extension member 238 retracts until the tilting member is blocked from further rotation by the limit restrictor 314.

To tilt the projection axis 144 of the lights 142 to a desired angle other than the maximum upward tilt angle, the third telescoping segment 238 is extended relative to the second telescoping member 236 until the catch 216 on the linkage 214 engages the linkage regulator 218 and then a selected additional amount. The further the third telescoping segment is extended, the further the lights 142 and the projection axis 144 are tilted downwardly. By controlling further extension of the third telescoping segment 238 accordingly, any tilt angle of the projection axis 144, and thus, the lights 142, between the maximum upward tilt angle and the maximum downward tilt angle, can be achieved.

In an alternate embodiment of the invention, the lights 142 can be mounted on the light bar 244 facing in a direction opposite to that shown in FIGS. 5A and 5B. In this alternative embodiment, the projection axis 144 will accordingly have a downward tilt angle prior to engagement of the catch 216 with the linkage regulator 218. Further extension of the third telescoping segment 238 in this embodiment will then result in an upward rotation of the projection axis 144.

One advantage of the light tilting apparatus 110 is the relative ease with which the tilt angle of the lights can be adjusted. Rather than adjusting the tilt angle on the ground and then rotating the extendible light tower to the upright position to verify the tilt angle, the light tilting apparatus of the present invention allows an operator to accurately adjust the tilt angle with the lights already in an extended operating position simply by extending or retracting the third telescoping segment a selected amount. Lowering of the entire light tower is not required. In addition, subsequent adjustments to the tilt angle to aim the lights 142 can be readily made by simply adjusting the position of the telescoping tower as required.

As will be appreciated by those of ordinary skill in the relevant art, a further advantage of the light tilting apparatus 110 is the relative simplicity of the system. Whereas conventional tilting mechanisms may require elaborate cable systems or electric servo-motors, the tilting apparatus of the present invention utilizes basic mechanical elements in order to achieve the desired adjustability of the light angle. This leads to a robust system that is relatively inexpensive to manufacture and service.

Figure 6:
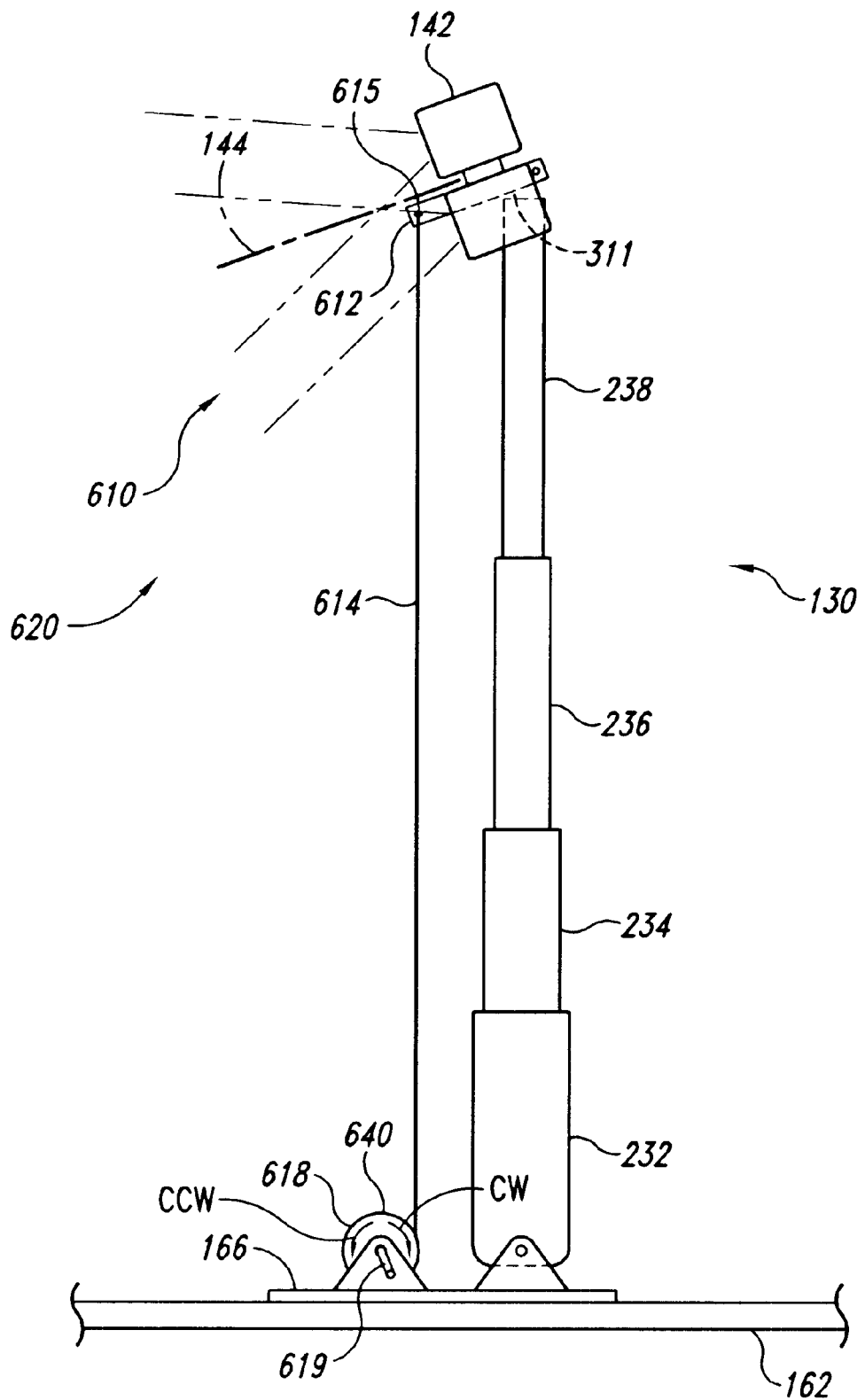
FIG. 6 is an enlarged side elevational view of an extendable light tower having a tiltable light assembly in accordance with an alternate embodiment of the invention.

FIG. 6 is a side elevation view of an extendable light tower 620 having a light tilting apparatus 610 in accordance with an alternate embodiment of the invention. The light tilting apparatus 610 has a tilting member 612 which is substantially similar to the tilting member 212 described in accordance with FIGS. 2 through 5B. The lights 142 are mounted to the tilting member 612 so that pivoting motion of the tilting member 612 relative to the third telescoping segment 238 results in a tilting of the projection axis 144.

In the illustrated alternate embodiment, a flexible linkage 614 is operably connected at one end to the pivoting member 612 at a pivot point 615. The flexible linkage 614 is operably coupled at its other end to a linkage regulator 618. In one aspect of this embodiment, the flexible linkage 614 is a flexible cable. In other embodiments, the flexible linkage 614 can be other flexible elements capable of sustaining a tension load sufficient to overcome the force of the biasing member 311 pushing upwardly on the tilting member 612.

In the illustrated embodiment, the linkage regulator 618 is a spool assembly having a spring-loaded drum 640 which maintains tension on the flexible linkage 614 at all times. The linkage regulator 618 is configured to spool-out the flexible linkage 614 as the extendable tower 130 is extended by rotation of the spring-loaded drum 640 in a first direction. Similarly, the linkage regulator 618 is configured to spool-in the flexible linkage 614 as the extendable tower 130 is retracted by counter-rotation of the spring-loaded drum 640 in a second direction.

The linkage regulator 618 of the illustrated alternate embodiment is fixedly mounted to the rotatable coupling 166 on the trailer bed 162 so that it will turn in the horizontal plane with the extendable tower 130 and yet remain stationary with respect to the third telescoping segment 238 during tower extension. In other embodiments, the linkage regulator 618 can alternatively be fixedly mounted directly to the trailer bed 162, the base member 232, or another suitable adjacent structure which remains relatively stationary during extension of the third telescoping segment 238.

Tilting the projection axis 144, and hence the light assembly 142, with the light tilting apparatus 610 is substantially similar to tilting the projection axis with the light tilting apparatus 210 of FIGS. 2 through 5B. As the extendable tower 130 is extended, the linkage regulator 618 spools-out the flexible linkage 614. The spring-loaded drum 640 maintains tension on the flexible linkage 614 as the linkage is spooled-out, but not enough tension to overcome the force of the biasing member 311 pushing upwardly on the tilting member 612. Thus, the tilting member 612, and hence the projection axis 144, will be tilted upwardly during extension of the extendable tower 130. When the third telescoping segment 238 reaches a preselected extension position, the spring-loaded drum 640 stops rotating thus restraining the flexible linkage 614. Further extension of the third telescoping segment 238 relative to the restrained flexible linkage 614 causes the tilting member 612 to rotate downwardly against the force of the biasing member 311, thereby rotating the projection axis 144 and the lights 142 downwardly. Conversely, the projection axis 144 and the lights 142 can accordingly be rotated upwardly by retracting the third telescoping segment 238. By controlling the amount of extension of the third telescoping segment 238, any desired position of the projection axis 144 between the maximum downward and maximum upward angle can be achieved.

Figure 7:
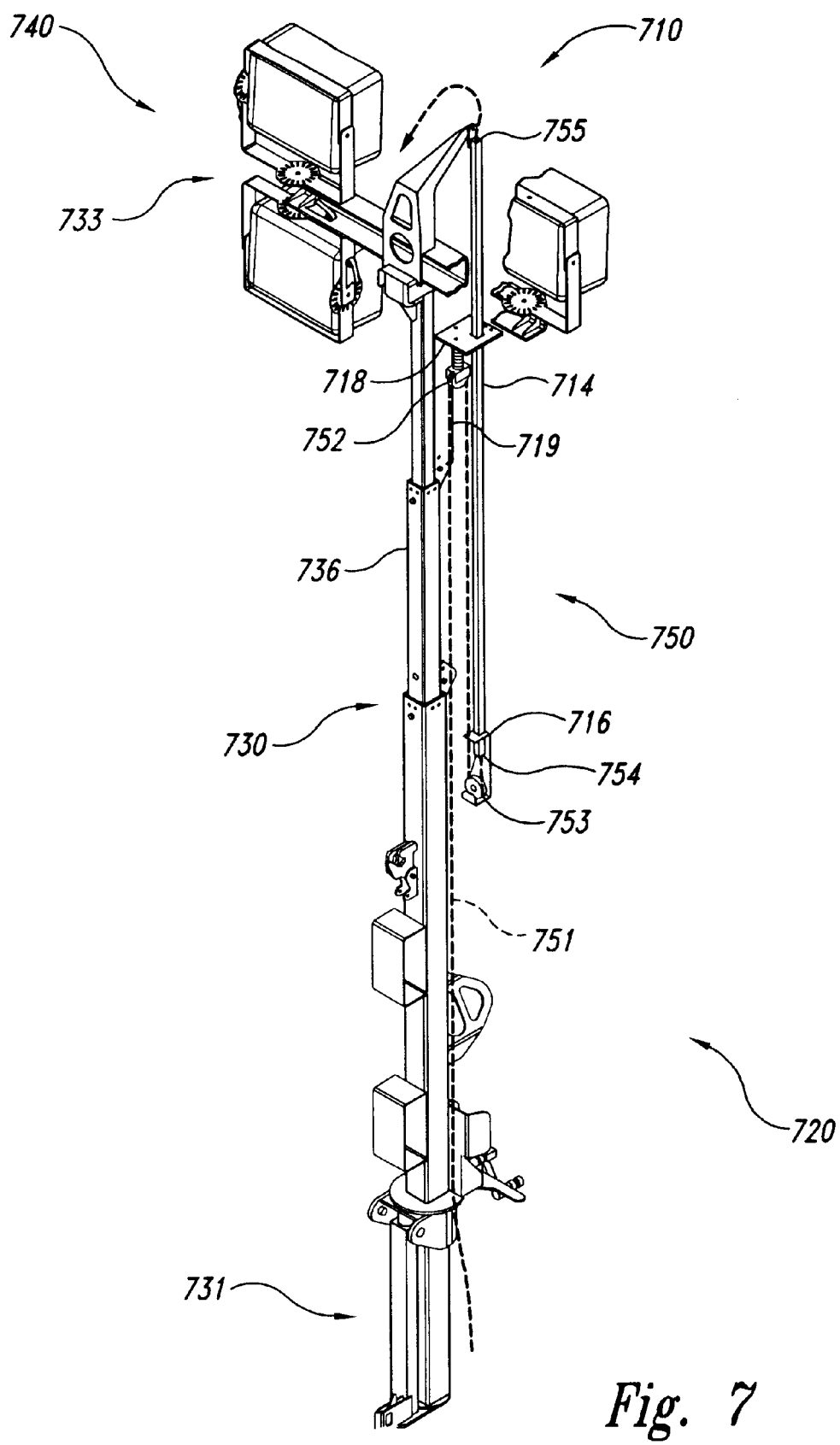
FIG. 7 is a partial cutaway isometric view of an extendable light tower having a tiltable light assembly and a cable management system in accordance with an embodiment of the invention.

FIG. 7 is a partial cutaway isometric view of an extendable light tower 720 having a cable management system 750 in accordance with an alternate embodiment of the invention. The extendable light tower 720 of the illustrated embodiment includes a telescoping tower assembly 730 having a lower tower portion 731 and an upper tower portion 733. The upper tower portion 733 supports a tiltable light assembly 740 having a light tilting apparatus 710. In one aspect of this embodiment, the telescoping tower assembly 730, the tiltable light assembly 740, and the light tilting apparatus 710 are substantially similar to, and function in a substantially similar manner as, the telescoping tower assembly 130, the tiltable light assembly 140, and the light tilting apparatus 110, respectively, described above in accordance with FIGS. 2–5.

In the illustrated embodiment, the extendable light tower 720 includes a power cable 751 extending between the lower tower portion 731 and the tiltable light assembly 740 to provide power for the lights. One end of the power cable 751 is connected to a generator or other power source (not shown). The power cable 751 extends away from the power source adjacent to the lower tower portion 731 toward the tiltable light assembly 740. An intermediate portion 719 of the power cable 751 passes over a first cable guide 752 mounted to a linkage regulator 718, so that the power cable changes directions and extends away from the tiltable light assembly. The linkage regulator 718 is mounted to a second telescoping segment 736 and functions in a substantially similar manner as the linkage regulator 218 described in accordance with FIG. 2. Accordingly, the linkage regulator 718 and the first cable guide 752 remain substantially stationary in the axial direction relative to the second telescoping segment 736. In one aspect of this embodiment, the first cable guide 752 is a pulley which rotatably supports the adjacent length of the power cable 751. In other embodiments, the first cable guide 752 can be other cable supports, for example, a simple hook or U-bolt that simply supports the power cable 751 without rotating.

The power cable 751 extends away from the first cable guide 752 and runs substantially adjacent to a linkage 714 that extends through the linkage regulator 718. The power cable 751 passes around a second cable guide 753 positioned adjacent to a lower linkage end 754 of the linkage 714, so that the power cable changes direction again and extends back toward the tiltable light assembly 740. Like the first cable guide 752, the second cable guide 753 of the illustrated embodiment is a pulley. In other embodiments, however, other cable supports can be used. In one aspect of this embodiment, the first and second cable guides 752 and 753 are spring-mounted to their respective foundations to accommodate dynamic irregularities and misalignments that could occur during tower extension and retraction and result in over-tensioning of the power cable 751.

The linkage 714 of the illustrated embodiment is an elongate rigid conduit that receives the power cable 751 as the cable extends away from the second cable guide 753. The power cable 751 enters the linkage 714 at the lower linkage end 754, extends through the linkage, and exits through an upper linkage end 755. From the upper linkage end 755, the power cable 751 extends over to the tiltable light assembly 740. Passing a portion of the power cable 751 through the inside of the linkage 714 protects that portion from damage or binding with adjacent moving hardware. Although the linkage 714 of the illustrated embodiment is an elongate rigid conduit, in alternate embodiments the linkage can be an elongate member and the power cable 751 can be attached, either fixedly or loosely, to the outside of the linkage 714 along the length of the linkage between the lower linkage end 754 and the upper linkage end 755.

The cable management system 750 is configured to manage the power cable 751 during extension and retraction of the telescoping tower assembly 730, so that the power cable 751 remains closely adjacent to the extendable light tower 720 whether the light tower is fully extended, fully retracted and stored, or in an intermediate position. Thus, the cable management system 750 helps avoid damage, tangling, or binding of the power cable 751 during operation or transport of the extendable light tower 720. In operation, when the telescoping tower assembly 730 is in the vertical operating position, the light tower 720 can be extended upwardly, thereby increasing the distance between the upper tower portion 733 and the lower tower portion 731. As the light tower extends, the second cable guide 753 moves upwardly toward the first cable guide 752. In addition, while the second cable guide 753 is moving closer to the first cable guide 752, the first cable guide 752 is simultaneously moving further away from the lower tower portion 731. In one aspect of this embodiment, the telescoping tower assembly 730 is configured so that the second cable guide 753 moves toward the first cable guide 752 at substantially the same rate as the first cable guide 752 moves away from the lower tower portion 731. As a result, the length of the power cable 751 being taken-up between the first and second cable guides 752 and 753 during tower extension is directly proportional to the length of power cable being fed-out between the first cable guide 752 and the lower tower portion 731. Thus, there is little or no sagging of the power cable 751 and the power cable remains closely adjacent to the extendable light tower 720.

When the telescoping tower assembly 750 is fully raised, a catch 716 attached to the lower linkage end 754 will engage the linkage regulator 718, and the first cable guide 752 will be adjacent to the second cable guide 753. The power cable 751 also remains closely adjacent to the light tower 720 as the telescoping tower assembly 730 retracts, returning the respective elements of the cable management system 750 to their initial positions. The cable management system 750 is also configured so the power cable 751 remains closely adjacent to the extendable light tower 720 when it is in the horizontal, stored position. The power cable 751 does not substantially droop and hang toward the ground, for example, when the extendable light tower 720 is transported to various locations.

The cable management system 750 of the present invention can be used not only with the tiltable light assembly of the illustrated embodiment, but can also be used with cables providing power to other appliances mounted to the upper portion 733 of the extendable tower 730. For example, the present invention can be used to manage a power cable for providing power to an audio system mounted to the upper portion 733 of the telescoping tower assembly 730.

One advantage of the cable management system 750 is that it obviates the need for an operator to monitor deployment of the power cable 751 during extension and retraction of the telescoping tower assembly 730 to avoid damage or binding. A further advantage of the cable management system 750 is the ease with which it can be incorporated with the light tilting apparatus of the present invention. The linkage 714 of the illustrated light tilting apparatus 710 provides a ready-made conduit in one embodiment that can guide and protect the power cable 751 and prevent the power cable from fouling the telescoping tower assembly 730 or the tiltable light assembly 740.

Although specific embodiments of, and examples for, the present invention are described for illustrative purposes, various equivalent modifications can be made without departing from the spirit or scope of the present invention, as will be recognized by those of skill in the relevant art. For example, the teachings provided for a tiltable light assembly can be applied not only to the exemplary mobile lighting system described above, but to other extendible lighting assemblies where adjustment of the light projection angle would be advantageous.

These and other changes can be made to the invention in light of the above detailed description. Therefore, the terms used in the following claims should not be construed to limit the invention to the specific embodiments disclosed, but in general should be construed to include all lighting systems and extendible towers that operate in accordance with the claims to provide a tiltable light assembly. Accordingly, the invention is not limited by this disclosure, but instead its scope is to be determined entirely by the following claims.

We claim:

1. A light tilting apparatus usable with a light assembly on an extendable tower, the apparatus comprising:
    a tilting member configured to support the light assembly on the extendable tower, the tilting member being pivotally mountable relative to the extendable tower and adapted to selectively tilt the light assembly about a pivot point relative to the extendable tower;
    a linkage operably connected to the tilting member at a position offset from the first pivot point, the linkage being translationally moveable relative to the extendable tower; and
    a linkage regulator positioned adjacent to the linkage, the linkage regulator positioned to permit movement of the linkage relative to the linkage regulator as the extendable tower is extended up to a preselected extension position, the linkage regulator being positioned to restrict movement of the linkage relative to the linkage regulator when the extendable tower moves beyond the preselected extension position, the linkage causing the tilting member to pivot about the pivot point as the extendable tower moves beyond the preselected extension position resulting in a tilting of the light assembly relative to the extendable tower.

2. The light tilting apparatus of claim 1 wherein the extendable tower is a telescoping tower assembly.

3. The light tilting apparatus of claim 1 wherein the light assembly is comprised of a plurality of lights mounted to a light bar, and the tilting member is configured to attach to the light bar and pivot the light assembly as a unit relative to the extendable tower.

4. The light tilting apparatus of claim 1 wherein:
    the linkage is an elongate rigid member pivotally connected at one end to the tilting member and having a catch on the other end spaced apart from the tilting member; and
    the linkage regulator is a rigid guide member positioned to engage the catch on the linkage.

5. The light tilting apparatus of claim 4 wherein the linkage extends through the linkage regulator.

6. The light tilting apparatus of claim 4 wherein the catch is a substantially hook-shaped member positioned to hook onto and engage the linkage regulator when the extendable tower reaches the preselected extension position.

7. The light tilting apparatus of claim 1 wherein the linkage is at least substantially parallel to, and offset from, the extendable tower.

8. The light tilting apparatus of claim 1 further comprising a limit restrictor positioned to prevent the tilting member from pivoting beyond a preselected position.

9. The light tilting apparatus of claim 1 further comprising a biasing member exerting a biasing force against the tilting member.

10. The light tilting apparatus of claim 1 further comprising:
   a limit restrictor positioned to prevent the tilting member from pivoting beyond a preselected position; and
   a biasing member exerting a biasing force against the tilting member that biases the tilting member toward the limit restrictor.

11. The light tilting apparatus of claim 1 wherein:
   the extendable tower has first and second tower portions axially moveable relative to each other;
   the tilting member is pivotally mountable relative to the second tower portion at the pivot point; and
   the linkage regulator is positioned substantially stationary relative to the first tower portion.

12. The light tilting apparatus of claim 1 wherein:
   the linkage is an elongate flexible member; and
   the linkage regulator is a spool assembly connected to the elongated flexible member.

13. A light tilting apparatus usable with a light assembly on a telescoping tower assembly, the telescoping tower assembly having a base segment, a first telescoping segment axially moveable relative to the base segment, and a second telescoping segment axially moveable relative to the first telescoping segment between a fully retracted position and a fully extended position, the light tilting apparatus comprising:
   a tilting member configured to support the light assembly on the telescoping tower assembly, the tilting member being pivotally mountable to the second telescoping segment so that pivoting of the tilting member results in tilting of the light assembly about a pivot point relative to the telescoping tower assembly;
   a linkage operably connected at one end to the tilting member at a position offset from the pivot point, the linkage having a catch on a distal end; and
   a linkage regulator attachable to the first telescoping segment or to the base segment, the linkage regulator having a guide portion that guides the linkage as the second telescoping segment moves between the fully retracted position and an intermediate position located between the fully retracted and fully extended positions, the linkage regulator positioned to engage the catch on the linkage when the second telescoping segment reaches the intermediate position and restrict movement of the linkage relative to the linkage regulator, the linkage causing the tilting member to pivot about the pivot point as the second telescoping segment is moves between the intermediate and fully extended positions.

14. The light tilting apparatus of claim 13 wherein the linkage is positionable at least substantially parallel to, and offset from, the telescoping tower assembly.

15. The light tilting apparatus of claim 13 wherein:
   the telescoping tower assembly further comprises a third telescoping segment disposed between the first and second telescoping segments, the third telescoping segment being axially moveable relative to the first telescoping segment; and
   the linkage regulator is attachable to the base segment, the first telescoping segment, or the third telescoping segment.

16. The light tilting apparatus of claim 13 wherein:
   the linkage is an elongate rigid member pivotally connected at one end to the tilting member and having the catch on the other end spaced apart from the tilting member.

17. The light tilting apparatus of claim 13 further comprising a limit restrictor positioned to prevent the tilting member from pivoting beyond a preselected position.

18. A tiltable light assembly usable with an extendable tower, the tiltable light assembly comprising:
   a light assembly;
   a tilting member configured to support the light assembly on the extendable tower, the tilting member being pivotally mountable relative to the extendable tower and positioned to selectively tilt the light assembly about a pivot point relative to the extendable tower;
   a linkage operably connected to the tilting member at a position offset from the pivot point, the linkage being translationally moveable relative to the extendable tower; and
   a linkage regulator positioned adjacent to the linkage, the linkage regulator configured to permit movement of the linkage relative to the linkage regulator as the extendable tower is extended up to a preselected extension position, the linkage regulator positioned to prevent movement of the linkage relative to the linkage regulator when the extendable tower reaches the preselected extension position, the linkage causing the tilting member to pivot about the pivot point as the extendable tower moves beyond the preselected extension position.

19. The tiltable light assembly of claim 18 wherein the light assembly is comprised of a plurality of lights mounted to a light bar, and the light bar is attached to the tilting member.

20. The tiltable light assembly of claim 18 wherein:
   the linkage is an elongate rigid member pivotally connected at one end portion to the tilting member and having a catch on the other end portion spaced apart from the tilting member; and
   the linkage regulator is a rigid guide member attachable to the extendable tower, the linkage regulator being positioned to engage the catch on the linkage and restrict movement of the linkage relative to the linkage regulator when the extendable tower moves beyond the preselected extension position.

21. The tiltable light assembly of claim 18 wherein the linkage extends through the linkage regulator.

22. The tiltable light assembly of claim 18 further comprising a limit restrictor positioned to prevent the tilting member from pivoting beyond a preselected position.

23. The tiltable light assembly of claim 22, further comprising a biasing member exerting a biasing force against the tilting member that biases the tilting member toward a selected position.

24. The tiltable light assembly of claim 18 wherein:
   the extendable tower has first and second tower portions axially moveable relative to each other;

the tilting member is pivotally mountable relative to the second tower portion at the pivot point; and the linkage regulator is positioned substantially stationary relative to the first tower portion.

25. The tiltable light assembly of claim 18 wherein the linkage is an elongate rigid member connected at an upper linkage end portion to the tilting member and having a lower linkage end portion spaced apart from the tilting member, and wherein the tiltable light assembly further comprises:

a power cable connected to the tiltable light assembly, the linkage supporting a portion of the power cable extending adjacent to the linkage between the lower and upper linkage end portions; and a cable support fixedly attachable relative to the extendable tower adjacent to the linkage, the cable support being positioned at least substantially between the lower and upper linkage end portions and configured to support a portion of the power cable extending from the lower linkage end portion.

26. The tiltable light assembly of claim 18 wherein the linkage is an elongate conduit member connected at an upper linkage end portion to the tilting member and having a catch toward a lower linkage end portion spaced apart from the tilting member, wherein the linkage regulator is a rigid guide member attachable to the extendable tower, the linkage regulator being positioned to engage the catch on the linkage and restrict movement of the linkage relative to the linkage regulator when the extendable tower moves beyond the preselected extension position, and wherein the tiltable light assembly further comprises:

a power cable connected to the tiltable light assembly, the linkage being configured to enclose a portion of the power cable extending through the linkage between the lower and upper linkage end portions; and a cable pulley mounted to the linkage regulator and configured to rotatably support a portion of the power cable extending from the lower linkage end portion.

27. An extendable light tower assembly comprising:

an extendable tower having first and second tower portions moveable relative to each other;

a light assembly coupled to the second tower portion;

a tilting member connected the light assembly and being pivotally mounted relative to the second tower portion and positioned to selectively tilt the light assembly about a pivot point relative to the extendable tower;

a linkage operably connected to the tilting member at a position offset from the first pivot point, the linkage being translationally moveable relative to the extendable tower; and a linkage regulator positioned adjacent to the linkage, the linkage regulator positioned to permit movement of the linkage relative to the linkage regulator as the extendable tower is extended up to a preselected extension position, the linkage regulator positioned to restrict movement of the linkage relative to the linkage regulator when the extendable tower moves beyond the preselected extension position causing the tilting member to pivot about the pivot point to tilt the light assembly relative to the extendable tower.

28. The extendable light tower assembly of claim 27 further comprising a limit restrictor fixedly positioned to prevent the tilting member from pivoting beyond a preselected position.

29. The extendable light tower assembly of claim 27 further comprising a biasing member exerting a biasing force against the tilting member that biases the tilting member toward the limit restrictor.

30. The extendable light tower assembly of claim 27 wherein the extendable tower is a telescoping tower assembly.

31. The extendable light tower assembly of claim 27 wherein the light assembly is comprised of a plurality of lights mounted to a light bar, and the light bar is attached to the tilting member so that the light assembly pivots with the tilting member as a unit relative to the extendable tower.

32. The extendable light tower assembly of claim 27 wherein:

the linkage is an elongate rigid member pivotally connected at one end to the tilting member and having a catch on the other end spaced apart from the tilting member; and the linkage regulator is a rigid guide member attached to the extendable tower, the linkage regulator being positioned to engage the catch when the extendable tower reaches the preselected extension position.

33. The extendable light tower assembly of claim 27 wherein the linkage is an elongate flexible member.

34. The extendable light tower assembly of claim 27 wherein the linkage is an elongate rigid member pivotally connected at an upper linkage end portion to the tilting member and having a lower linkage end portion spaced apart from the tilting member, and wherein the extendable light tower assembly further comprises:

a power cable for providing power from a power source to the light assembly, wherein the linkage is configured to support a portion of the power cable extending adjacent to the linkage between the lower and upper linkage end portions; and a cable support attached to the extendable tower adjacent to the linkage and positioned at least substantially between the lower and upper linkage end portions, the cable support being configured to support a portion of the power cable extending from the lower linkage end portion.

35. The extendable light tower assembly of claim 27 wherein the linkage is an elongate conduit connected at an upper linkage end portion to the tilting member and having a catch toward a lower linkage end portion spaced apart from the tilting member, wherein the linkage regulator is a rigid guide member attached to the extendable tower, the linkage regulator being positioned to engage the catch on the linkage and restrict movement of the linkage relative to the linkage regulator when the extendable tower moves beyond the preselected extension position, and wherein the extendable light tower assembly further comprises:

an elongate flexible power cable extending between the first tower portion and the light assembly, wherein a portion of the power cable extends through the linkage between the lower and upper linkage end portions;

a first cable pulley mounted to the lower linkage end portion and configured to rotatably support a portion of the power cable adjacent to the lower linkage end portion; and a second cable pulley mounted to the linkage regulator and configured to rotatably support a portion of the power cable extending between the lower linkage end portion and the first tower portion.

36. A mobile lighting system having an extendable light tower with a tiltable light assembly usable for lighting a work area, the mobile lighting system comprising:

a trailer having a trailer bed coupled to a wheel assembly;

an extendable tower having first and second tower portions moveable relative to each other, the extendable tower being operatively coupled to the trailer bed toward the first tower portion;

a light assembly coupled to the second tower portion;

a tilting member connected to the light assembly on the extendable tower, the tilting member being pivotally mounted relative to the second tower portion and adapted to selectively pivot about a pivot point relative to the extendable tower;

a linkage operably coupled to the tilting member at a position offset from the pivot point, the linkage being translationally moveable relative to the extendable tower; and a linkage regulator positioned adjacent to the linkage, the linkage regulator positioned to permit movement of the linkage relative to the linkage regulator as the extendable tower is extended up to a preselected extension position, the linkage regulator positioned to restrict movement of the linkage relative to the linkage regulator when the extendable tower moves beyond the preselected extension position causing the tilting member to pivot about the pivot point and the light assembly relative to the extendable tower.

37. The mobile lighting system of claim 36 wherein the extendable tower is rotatably coupled to the trailer bed.

38. The mobile lighting system of claim 36 wherein the extendable tower is a telescoping tower assembly.

39. The mobile lighting system of claim 36 wherein the light assembly is comprised of a plurality of lights mounted to a light bar, and the light bar is attached to the tilting member.

40. The mobile lighting system of claim 36 further comprising a limit restrictor fixedly attached to the second tower portion adjacent to the tilting member and positioned to prevent the tilting member from pivoting beyond a preselected position.

41. The mobile lighting system of claim 36 wherein:

the linkage is an elongate rigid member pivotally connected at one end to the tilting member and having a catch on the other end spaced apart from the tilting member; and the linkage regulator is a guide member rigidly attached to the extendable tower.

42. The mobile lighting system of claim 36 wherein the linkage is an elongate flexible member.

43. A cable management system, useable for managing a power cable on an extendable tower, the extendable tower having a lower tower portion and an upper tower portion moveable relative to each other, the power cable having a source end toward the lower tower portion for receiving power from a power source and an appliance end toward the upper tower portion for providing power to an appliance mounted toward the upper tower portion, the cable management system comprising:

an elongate cable guide positioned adjacent to the upper tower portion and at least substantially parallel to the extendable tower, the elongate cable guide having an upper guide end portion supporting a portion of the power cable toward the upper tower portion, and a lower guide end portion supporting a portion of the power cable toward the lower tower portion; and a cable support fixedly mounted to the extendable tower adjacent to the elongate cable guide and positioned at least substantially between the lower and upper guide end portions, the cable support being configured to support a portion of the power cable extending between the lower guide end portion and the lower tower portion.

44. An extendable light tower assembly comprising:

an extendable tower having a lower tower portion and an upper tower portion moveable relative to each other;

a light assembly coupled to the upper tower portion;

a power cable having a source end toward the lower tower portion for receiving power and an appliance end toward the upper tower portion for providing power to the light assembly;

an elongate cable guide positioned adjacent to the upper tower portion and at least substantially parallel to the extendable tower, the elongate cable guide having an upper guide end portion supporting a portion of the power cable toward the upper tower portion, and a lower guide end portion supporting a portion of the power cable toward the lower tower portion; and a cable support fixedly mounted to the extendable tower adjacent to the elongate cable guide and positioned at least substantially between the lower and upper guide end portions, the cable support being configured to support a portion of the power cable extending between the lower guide end portion and the lower tower portion.

* * * * *